United States Patent [19]
Hara et al.

[11] Patent Number: 5,432,280
[45] Date of Patent: Jul. 11, 1995

[54] GEL-FORMING SILICONE COMPOSITION

[75] Inventors: Hiroyasu Hara, Annaka; Masayuki Ikeno, Maebashi; Takehide Okami, Annaka, all of Japan

[73] Assignee: Shin-Etsu Chemical Co., Ltd., Tokyo, Japan

[21] Appl. No.: 85,032

[22] Filed: Jul. 2, 1993

[30] Foreign Application Priority Data

Jul. 3, 1992 [JP] Japan .................. 4-200317
Sep. 30, 1992 [JP] Japan .................. 4-285112

[51] Int. Cl.⁶ ............................................. C08K 5/54
[52] U.S. Cl. ........................... 524/730; 524/265; 528/15; 528/16
[58] Field of Search ............ 528/15, 16; 524/730, 524/265

[56] References Cited
U.S. PATENT DOCUMENTS 4,742,103 5/1988 Morita et al. ............... 524/730
5,276,086 1/1994 Arai et al. .................... 524/730

*Primary Examiner*—Melvyn I. Marquis
*Attorney, Agent, or Firm*—Oblon, Spivak, McClelland, Maier, & Neustadt

[57] ABSTRACT

A gel-forming silicone composition comprising, compounded in a gel-forming base composition, a silane compound having the following general formula (1) or (2):

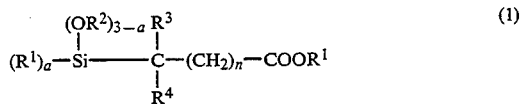

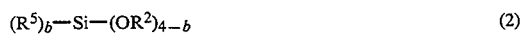

wherein $R^1$ is an alkyl or aryl group, $R^2$ is an alkyl or alkoxyalkyl group, $R^3$ and $R^4$ are each a hydrogen atom, a methyl group or an ethyl group, $R^5$ is an alkyl group or an ester linkage-containing group, and a, b and n are each an integer from 0 to 2. The composition is capable of forming, under mild conditions, a silicone gel which exhibits good adherence to a variety of substrates.

5 Claims, No Drawings

GEL-FORMING SILICONE COMPOSITION

BACKGROUND OF THE INVENTION

1. Field of the Invention

The present invention relates to a gel-forming silicone composition, and more particularly to a silicone composition which, when heated to a relatively low temperature, is able to form a gel cured product (namely, is curable to be a silicone gel) having good adhesion to electronic component parts and the like.

2. Description of the Prior Art

Heretofore, silicone gels have been used for protection of electronic devices such as hybrid ICs, etc. A silicone gel for this use is required to have good adhesion to electronic parts and the like, in order to protect the electronic parts against water and so on.

As a material for forming silicone gel, there have been known a variety of addition-curing type organopolysiloxane compositions (See Japanese Pre-examination Patent Publication (KOKAI) Nos. 56-143241, 62-39659, 635655 and 63-33475.).

However, gel cured products obtained from the above-described compositions have the drawback of low adhesive properties and, hence, poor adherence to substrates. That is, where such a composition is used for potting an electronic part, the resulting gel cured product may separate from the electronic part to generate a gap therebetween, allowing moisture, water or the like to come in through the gap to cause corrosion, insulation failure or the like.

On the other hand, there are known a number of techniques for obtaining an elastomer having good adhesive properties by use of an adhesion promotor. The adhesion promotors used in these techniques include an organopolysiloxane containing a silicon-bonded hydrogen atom and a trialkoxysilyl group (See Japanese Pre-examination Patent Publication (KOKAI) No. 48-16592), an organopolysiloxane containing a silicon-bonded hydrogen atom as well as an ester group and/or a glycidyl group (See Japanese Pre-examination Patent Publication (KOKAI) No. 50-39345), a reaction product of an aminoalkylalkoxysilane and a glycidoxyalkylalkoxysilane (See Japanese Patent Publication (KOKOKU) Nos. 52-8854 and 55-41702), and so on. These techniques, however, have the disadvantage that adhesion cannot be developed in a short time or that a satisfactory adhesion cannot be obtained at room temperature or by heating to a slightly raised temperature. Besides, the conventional techniques using an adhesion promotor as above are primarily for compositions which form a highly elastic cured product (elastomer), and the cured product is quite different from a gel cured product. For instance, where such an elastomer is used as a protecting or insulating material for semiconductor circuit components or the like, thermal stress will be generated in the elastomer itself due to heat generation by the circuit components, environmental temperature conditions, etc., resulting in breakage of the semiconductor device. Moreover, where the technique is applied to a gel-forming composition, it is difficult to prepare a composition having low crosslink degree, which is an intrinsic property of gels.

SUMMARY OF THE INVENTION

It is accordingly an object of the present invention to provide a silicone composition capable of forming a gel cured product with good adhesion to electronic parts, etc. under heating to a comparatively low temperature.

According to the present invention, there is provided a gel-forming silicone composition comprising:

(A) an organopolysiloxane containing an average of from 0.1 to 2 silicon-bonded alkenyl groups in its molecule and having a viscosity of from 50 to 100,000 cP at 25° C.;

(B) an organohydrogenpolysiloxane containing an average of at least 2 silicon-bonded hydrogen atoms in its molecule, the amount of said silicon-bonded hydrogen atoms being in the range from 0.2 to 3.0 equivalents per equivalent of vinyl groups in said organopolysiloxane (A);

(C) (C-1) a silane compound having the following general formula (1):

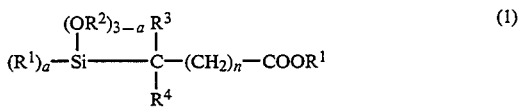

wherein $R^1$ is a substituted or unsubstituted monovalent hydrocarbon group, $R^2$ is an alkyl group or an alkoxyalkyl group, $R^3$ and $R^4$ may be the same or different from each other and are each any one of a hydrogen atom, a methyl group and an ethyl group, a is an integer from 0 to 2, and n is an integer from 0 to 2, or (C-2) a silane compound having the following general formula (2):

wherein $R^2$ is the same as defined above, $R^5$ is at least one group selected from the group consisting of unsubstituted or substituted monovalent hydrocarbon groups, hydrogen atom, and groups represented by the following formula (2a) or (2b):

wherein in the formulas (2a) and (2b), R is an
alkylene group, and $R^6$ is an alkyl group or an aryl group,
and b is an integer from 0 to 2, or partial hydrolyzate thereof; and (D) a platinum group metal catalyst.

It is a characteristic feature of the silicone composition of the present invention to comprise a silane compound having the above general formula (1) or (2). With the silane compound thus compounded, the silicone composition is able to form a gel cured product with good adhesion to various substrates, under heating to a relatively low temperature.

The gel cured product, or silicone gel, herein refers to a cured silicone product which has a penetration, as specified in ASTM D-1403 (¼ cone), of from 0 to 200.

DETAILED DESCRIPTION OF PREFERRED EMBODIMENTS

(A) Organopolysiloxane

The organopolysiloxane of the component (A) used as a base polymer in the present invention contains an average of from 0.1 to 2 alkenyl groups in its molecule and has a viscosity at 25° C. of from 5 to 10,000 cP. Where, for example, the average number of alkenyl groups per molecule is outside of the above-described range, it is difficult to form a gel cured product, and the silicone gel, if formed, will be poor in such properties as heat resistance. The alkenyl groups contained in the organopolysiloxane (A) include, for example, vinyl, allyl, propenyl and the like, of which preferred is vinyl.

The organopolysiloxane as above is represented, for example, by the following average unit formula:

$$R^7_p SiO_{(4-p)/2}$$

wherein $R^7$ is an unsubstituted or substituted monovalent hydrocarbon group, and p is a number in the range from 1.9 to 2.4. The monovalent hydrocarbon group $R^7$ includes alkenyl groups such as vinyl, allyl and the like; other groups than alkenyl which can be used as $R^7$ include, for example, alkyl groups such as methyl, ethyl, propyl and butyl, cycloalkyl groups such as cyclohexyl, aryl groups such as phenyl and tolyl, and aralkyl groups such as benzyl, phenylethyl, and the like. Further, in each of these groups, part or all of the hydrogen atoms may be substituted by a halogen atom or the like. Namely, for example, halogen-substituted hydrocarbon groups such as chloromethyl, 3,3,3-trifluoropropyl and the like can also be used as $R^7$. Among the other groups than alkenyl, particularly preferred is the methyl group. Where solvent resistance is of particular importance, however, the 3,3,3-trifluoropropyl group is most suited.

The organopolysiloxane may be linear or branched in structure. The organopolysiloxane can be prepared by known methods in which an equilibration reaction is carried out in the presence of an alkali or acid catalyst.

(B) Organohydrogenpolysiloxane

The organohydrogenpolysiloxane of the component (B) has an average of at least 2 silicon-bonded hydrogen atoms in its molecule. The component (B) acts as a crosslinking agent, that is, the silicon-bonded hydrogen atom in the component (B) performs an addition reaction with the alkenyl group in the component (A), whereby a gel cured product of a three-dimensional network structure is formed.

The molecular structure of the organohydrogenpolysiloxane is not particularly restricted. For example, the organohydrogenpolysiloxane may be of linear, cyclic, branched or other structure. From the viewpoint of preparation, the organohydrogenpolysiloxane for use as the component (B) preferably has a viscosity at 25° C. of from 5 to 10,000 cP.

In the organohydrogenpolysiloxane, the other groups than the hydrogen atoms which are bonded to silicon atoms include, for example, alkyl groups such as methyl, ethyl, propyl, butyl and the like; cycloalkyl groups such as cyclohexyl and the like; aryl groups such as phenyl, tolyl and the like; and aralkyl groups such as benzyl, phenylethyl and the like. In each of these groups, part or all of hydrogen atoms may be substituted by a halogen atom or the like. That is, such groups as chloromethyl and 3,3,3-trifluoropropyl groups can also serve as said other group than the hydrogen atoms bonded to silicon atoms in the organohydrogenpolysiloxane. Among these groups, preferred are methyl, phenyl and 3,3,3-trifluoropropyl groups.

The organohydrogenpolysiloxane is used in an amount such that the amount of the silicon-bonded hydrogen atoms thereof is from 0.2 to 3.0 equivalents, preferably from 0.5 to 1.5 equivalents per equivalent of the alkenyl groups in the organopolysiloxane of the component (A). If the amount of the organohydrogenpolysiloxane is above the range specified, foaming may be caused by a dehydrogenation reaction between the organohydrogenpolysiloxane (B) and the component (A) or heat resistance of the resulting silicone gel may be lowered. If the amount is below the range, on the other hand, the resulting silicone gel will have too low a crosslink density and be unsatisfactory in heat resistance.

The organohydrogenpolysiloxane also can be prepared by methods which are known per se.

(C) Silane compound

As the silane compound of the component (C), a silane compound (C-1) having the above general formula (1) or a silane compound (C-2) having the above general formula (2) is used. These silane compounds can, of course, be used in combination. As has been described above, with the silane compound or compounds (C-1), (C-2) incorporated in the silicone composition, it is possible to form a gel cured product with good adhesion to a variety of substrates.

The amount of the silane compound or compounds of the component (C) is preferably in the range from 0.01 to 10 parts by weight, more preferably from 0.1 to 2 parts by weight, per 100 parts by weight of the organopolysiloxane of the component (A). If the amount is less than 0.01 part by weight, the resulting gel cured product does not show satisfactory adhesion, whereas if the amount exceeds 10 parts by weight, the resulting gel cured product tends to have a lowered chemical stability.

In the above general formula (1) representing the silane compound (C-1), the unsubstituted or substituted monovalent hydrocarbon group $R^1$ is exemplified typically by alkyl groups such as methyl, ethyl, propyl, butyl and the like, and aryl groups such as phenyl and the like. The alkyl groups which can be used as $R^2$ include, for example, those alkyl groups which have up to 4 carbon atoms, such as methyl, ethyl, propyl and butyl. The alkoxyalkyl groups usable as $R^2$ include, for example, methoxymethyl, methoxyethyl, ethoxymethyl, ethoxyethyl and the like. In the formula (1), $R^3$ and $R^4$ are each a hydrogen atom, a methyl group or an ethyl group.

In the present invention, preferable examples of the silane compound (C-1) include the following compounds (Me stands for the methyl group, and Bu the butyl group).

$(MeO)_3SiCH_2COOMe,$ $(MeO)_3SiCH_2COOC_2H_5,$ $(MeO)_3SiCH_2COOC_3H_7,$ $(MeO)_3SiCH_2COOC_8H_{17},$

-continued (MeO)₃SiCH₂COO—Ph, (MeO)₃SiCH₂COO—Cy,

Me
|
(MeO)₂SiCH₂COOMe,

Me
|
(MeO)₂SiCH₂COOC₂H₅,

Me
|
(MeO)₂SiCH₂COOC₃H₇,

Me
|
(MeO)₂SiCH₂COOC₈H₁₇,

Me
|
(MeO)₂SiCOO—Ph,

Me
|
(MeO)₂SiCH₂COO—Cy,

Me₂
|
(MeO)SiCH₂COOMe,

Me₂
|
(MeO)SiCH₂COOC₂H₅,

Me₂
|
(MeO)SiCH₂COOC₃H₇,

Me₂
|
(MeO)SiCH₂COOC₈H₁₇,

Me₂
|
(MeO)SiCH₂COO—Ph,

Me₂
|
(MeO)SiCH₂COO—Cy, (H₅C₂O)₃SiCH₂COOMe, (H₅C₂O)₃SiCH₂COOC₂H₅, (H₅C₂O)₃SiCH₂COOC₃H₇, (H₅C₂O)₃SiCH₂COOC₈H₁₇, (H₅C₂O)₃SiCH₂COOBu, (H₅C₂O)₃SiCH₂COO—Ph,

-continued

Me
|
(H₅C₂O)₂SiCH₂COOMe,

Me
|
(H₅C₂O)₂SiCH₂COOC₂H₅,

Me
|
(H₅C₂O)₂SiCH₂COOC₃H₇,

Me
|
(H₅C₂O)₂SiCH₂COOC₈H₁₇,

Me
|
(MeO)₃SiCHCOOMe,

Me
|
(MeO)₃SiCHCOOC₂H₅,

Me
|
(MeO)₃SiCHCOOC₃H₇,

Me
|
(MeO)₃SiCHCOOC₈H₁₇,

Me      C₂H₅
|        |
(MeO)₃SiCHCOOCH₂CH(CH₂)₃CH₃,

Me
|
(MeO)₃SiCHCOO—Ph,

Me
|
(MeO)₃SiCHCOOBu,

Me   Me
|    |
(MeO)₂Si—CHCOOMe,

Me   Me
|    |
(MeO)₂Si—CHCOOC₂H₅,

Me   Me
|    |
(MeO)₂Si—CHCOOBu,

Me   Me      C₂H₅
|    |        |
(MeO)₂Si—CHCOOCH₂CH(CH₂)₃CH₃,

Me   Me
|    |
(MeO)₂Si—CHCOO—Ph,

Me₂  Me
|    |
(MeO)Si——CHCOOMe,

Me₂  Me
|    |
(MeO)Si——CHCOOC₂H₅,

Me₂  Me
|    |
(MeO)Si——CHCOOC₈H₁₇,

-continued

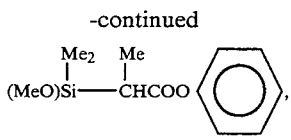

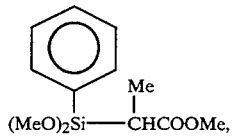

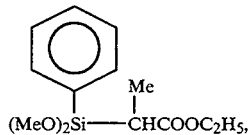

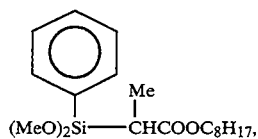

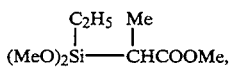

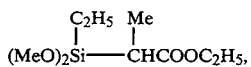

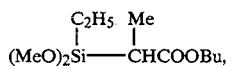

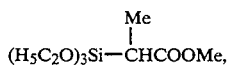

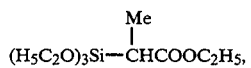

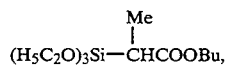

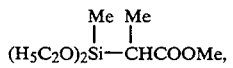

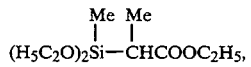

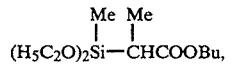

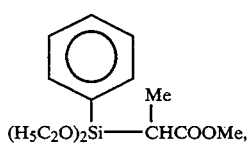

-continued

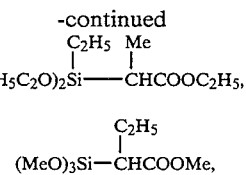

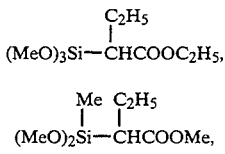

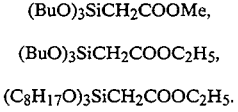

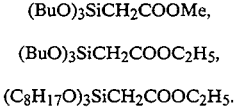

(BuO)$_3$SiCH$_2$COOMe, (BuO)$_3$SiCH$_2$COOC$_2$H$_5$, (C$_8$H$_{17}$O)$_3$SiCH$_2$COOC$_2$H$_5$.

In the above general formula (2) representing the silane compound (C-2), $R^2$ has the same meaning as the $R^2$ in the general formula (1), namely, is an alkyl group or alkoxyalkyl group.

In the general formula (2), further, $R^5$ is at least one group selected from the group consisting of unsubstituted or substituted monovalent hydrocarbon groups, hydrogen atom, and groups represented by the above formula (2a) or (2b). Specifically, the unsubstituted or substituted monovalent hydrocarbon groups for use as $R^5$ include, for example, alkyl groups such as methyl, ethyl, propyl and butyl, and aryl groups such as phenyl and the like, in each of which part or all of hydrogen atoms may be substituted by halogen or the like. Besides, in the above formulas (2a) and (2b), R is an alkylene group, preferably an alkylene group having up to 8 carbon atoms; $R^6$ is an alkyl group, preferably a lower alkyl group such as methyl, or an aryl group, preferably phenyl group.

In the present invention, preferable examples of the silane compound (C-2) include the following compounds.

| | | |
|---|---|---|
| (MeO)$_4$ Si, | (EtO)$_4$ Si, | (i-PrO)$_4$ Si, |
| Me(MeO)$_3$ Si, | Me(EtO)$_3$ Si, | Me(i-PrO)$_3$ Si, |
| Ph(MeO)$_3$ Si, | Ph(EtO)$_3$ Si, | Ph(i-PrO)$_3$ Si, |
| H(MeO)$_3$ Si, | H(EtO)$_3$ Si, | H(i-PrO)$_3$ Si, |
| Me$_2$ (MeO)$_2$ Si, | Me$_2$ (EtO)$_2$ Si, | Me$_2$ (i-PrO)$_2$ Si, |
| Ph$_2$ (MeO)$_2$ Si, | Ph$_2$ (EtO)$_2$ Si, | Ph$_2$ (i-PrO)$_2$ Si, |
| MeH(MeO)$_2$ Si, | MeH(EtO)$_2$ Si, | MeH(i-PrO)$_2$ Si, |
| (MeO)$_3$ SiOSi(MeO)$_3$ , | H(MeO)$_2$ SiOSiH(MeO)$_2$ , | |
| (MeO)$_3$ SiCH$_2$ CH$_2$ CH$_2$ OCOCH = CH$_2$ , | (MeO)$_3$ SiCH$_2$ CH$_2$ CH$_2$ OCOC(Me) = CH$_2$ , | |
| (MeO)$_3$ SiCH$_2$ COOMe , | (MeO)$_3$ SiCH$_2$ COOEt, | |
| (MeO)$_3$ SiCH$_2$ COOPr , | (MeO)$_3$ SiCH$_2$ COOC$_8$ H$_{17}$, | |
| (MeO)$_3$ SiCH$_2$ COOPh , | (MeO)$_3$ SiCH$_2$ COOC$_6$ H$_{10}$, | |
| (MeO)$_3$ SiCH$_2$ CH$_2$ Si(MeO)$_3$ , | (MeO)$_3$ SiCH(Me)COOEt. | |

In these formulas, Me stands for the methyl group, Et the ethyl group, Pr the propyl group, and Ph the phenyl group. The same applies hereinafter.

In place of the silane compound of (C-2), furthermore, a partial hydrolyzate thereof can be used.

(D) Platinum group metal catalyst

The platinum group metal catalyst of the component (D) is an addition reaction catalyst, and is used to accelerate the addition curing reaction between the components (A) and (B). The addition reaction catalyst is known per se, and includes, for example, platinum catalysts, rhodium catalysts and palladium catalysts, of which preferred are platinum catalysts. Specifically, platinum black, chloroplatinic acid, alcohol-modified chloroplatinic acid, complexes of chloroplatinic acid with an olefin, aidehyde, vinylsiloxane, acetylene alcohol or the like, and so on can be used suitably.

The platinum group metal catalyst may be used in any amount that is sufficient for accelerating the curing reaction between the components (A) and (B). Normally, the amount of the catalyst preferably ranges from 0.1 to 1,000 ppm in terms of the catalyst metal. A more preferable range for the catalyst amount is from 0.2 to 200 ppm, taking into account inhibition of cure by catalyst poisons as well as transparency of the resulting cured product and control of reaction.

Other compounding ingredients

In addition to the components (A) to (D) as described above, various compounding ingredients may be incorporated in the composition of the present invention within such ranges as not to impair the effects of the invention.

For example, where the silane compound of the component (C) comprises the above-described silane compound or partial hydrolyzate thereof (C-2), it is preferable to use an organic aluminum compound also. The organic aluminum compound has a catalytic action to accelerate hydrolysis of the silane compound or partial hydrolyzate thereof (C-2). When such organic aluminum compound is used together, the adhesion property of the gel cured product can be quickly developed, even at a relatively low temperature, leading to a shorter working time, etc., which is highly advantageous industrially. Any organic aluminum compound can be used for this purpose, and preferred examples of the organic aluminum compound include the followings:

aluminum alcoholates such as $Al(O-i-Pr)_3$, $Al(O-i-Pr)_2(O-sec-Bu)$, $Al(O-sec-Bu)_3$, $Ai(O-Et)_3$ and the like;

aluminum alkylacetoacetates such as $Al(acac)_3$, $Al(O-i-Pr)_2(acac)$ and the like;

alkylacetoacetatoaluminum alcoholates such as

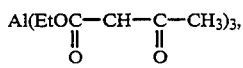

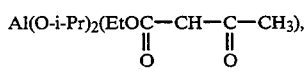

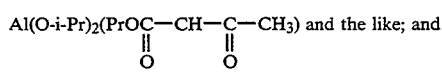

cyclic aluminum oxide alcoholates such as

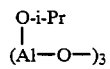

and the like.

The organic aluminum compound is preferably used, together with the silane compound or partial hydrolyzate thereof (C-2), in an amount of from 0.001 to 1 part by weight, more preferably from 0.005 to 0.2 part by weight, per 100 parts by weight of the component (A).

Furthermore, where the gel-forming curable composition according to the present invention is stored in the form of a one-part type package, it is suitable to incorporate a reaction controlling agent in the composition, for obtaining higher shelf stability. The reaction controlling agents which can be used include, for example, triallyl isocyanurate, alkyl maleates, acetylene alcohol and silane- or siloxane-modified products thereof, methyl-vinylcyclotetrasiloxane, hydroperoxides, tetramethylenediamine, benzotriazole, and the like. Normally, the amount of the reaction controlling agent compounded in the gel-forming composition ranges from about 0.001 to about 5 parts by weight per 100 parts by weight of the component (A). Besides, if necessary, fillers, pigments, thermal resistance improving agents, adhesion aids, flame retarders, solvents and the like may also be added to the composition of the present invention. Further, other organopolysiloxanes than the above-described may also be added to the composition of the invention.

Gel-forming composition

The curable composition according to the present invention, obtained by mixing uniformly the above-described components and optional compounding ingredients, if any, will cure easily and quickly when maintained at a temperature ranging from room temperature to around 60° C., to form a silicone gel which exhibits good adhesion to a variety of substrates. For instance, by pouring the composition of the present invention into a vessel containing electric or electronic component parts in an interconnected state or by immersing a wiring board or the like in the composition in a liquid form of the invention, it is possible to form a silicone gel which is adhered firmly to the substrate (the component parts, board, etc.).

Therefore, the silicone gel is highly suited to use as a protective potting or encapsulating material for electric or electronic components, such as ICs, and liquid crystal display devices, etc.

EXAMPLES

The working examples of the present invention and comparative examples will now be described below. In the following examples, viscosity is given in values measured at 25° C., and "part(s)" means "part(s) by weight" unless otherwise specified.

Examples 1 to 4 illustrate the cases of using a silane compound of (C-1), whereas Examples 5 to 8 illustrate the cases of using a silane compound of (C-2).

EXAMPLE 1

One hundred parts of a dimethylpolysiloxane having a viscosity of 1,000 cP represented by the following average formula:

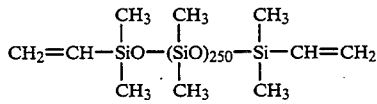

0.5 part of a methylhydrogensiloxane having the following average formula:

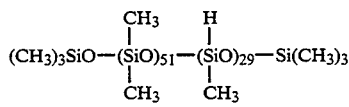

10 parts of a hydrogensiloxane having the following average formula:

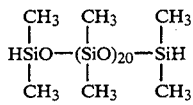

0.5 part of a silane compound having the following formula:

$(MeO)_3Si-CH_2COOMe$ and 0.03 part of an isopropyl alcohol solution of chloroplatinic acid (elemental platinum content: 2 wt. %) were compounded to prepare a curable composition.

The composition thus prepared was tested for adhesion to glass, acrylic resin and aluminum by 180° peel test. Namely, the curable composition was sandwiched between a clean surface of each substrate and an aluminum foil to have a thickness of 0.1 mm, and was cured by leaving to stand at room temperature for 24 hours, to give a specimen for measurement of peel force. Another specimen was prepared in the same manner as above except that the sandwiched composition was cured by heating at 60° C. for 30 minutes. Each of the thus prepared specimens was subjected to peel strength measurement in which the force required to peel off the cured composition from the substrate was measured at a pulling speed of 20 mm/min. The results are given in Table 1.

The cured product obtained in the above test was a colorless transparent gel. Penetration of the gel cured product is also given in Table 1.

EXAMPLE 2

A curable composition was prepared in the same manner as in Example 1 except for using 0.5 part of a silane compound having the following formula:

$(MeO)_3-Si-C(Me)HCOOMe$ in place of the silane compound used in Example 1. The curable composition obtained was subjected to the same measurements as in Example 1. The results are given in Table 1.

EXAMPLE 3

A curable composition was prepared in the same manner as in Example 1 except for using 0.5 part of a silane compound having the following formula:

in place of the silane compound used in Example 1. The thus obtained composition was subjected to the same measurements as in Example 1. The results are given in Table 1.

EXAMPLE 4

A curable composition was prepared in the same manner as in Example 1 except for using 0.5 part of a silane compound having the following formula:

$(EtO)_2-Si(Me)-C(Me)HCOOEt$ in place of the silane compound used in Example 1. The composition thus obtained was subjected to the same measurements as in Example 1. The results are given in Table 1.

Comparative Example 1

A curable composition was prepared in the same manner as in Example 1 except for using 0.5 part of a silane compound having the following formula:

$(MeO)_3-Si-CH=CH_2$ in place of the silane compound used in Example 1, and measurements were carried out in the same manner as in Example 1. The results are given in Table 1.

Comparative Example 2

A curable composition was prepared in the same manner as in Example 1 except for using 0.5 part of a silane compound having the following formula:

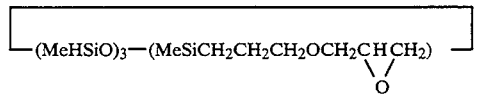

in place of the silane compound used in Example 1, and measurements were carried out in the same manner as in Example 1. The results are given in Table 1.

Comparative Example 3

A curable composition was prepared in the same manner as in Example 1 except that no silane compound was used. The composition thus obtained was subjected to the same measurements as in Example 1. The results are given in Table 1.

TABLE 1

| Substrate | Curing condition | Example | | | | Comp. Ex. | | |
|---|---|---|---|---|---|---|---|---|
| | | 1 | 2 | 3 | 4 | 1 | 2 | 3 |
| Glass | R.T. × 24 hrs | 230 | 190 | 230 | 250 | 40 | 30 | 20 |
| | 60° C. × 30 min | 230 | 200 | 210 | 190 | 70 | 70 | 15 |
| Acrylic resin | R.T. × 24 hrs | 190 | 170 | 190 | 200 | 20 | 25 | 15 |
| | 60° C. × 30 min | 200 | 180 | 200 | 220 | 60 | 80 | 20 |
| Aluminum | R.T. × 24 hrs | 250 | 200 | 180 | 190 | 40 | 50 | 20 |
| | 60° C. × 30 min | 240 | 180 | 190 | 170 | 80 | 70 | 20 |
| Penetration of cured product | | 20 | 21 | 20 | 19 | 31 | 16 | 21 |

Examples 5 to 8 and Comparative Examples 4 to 11

In each example, 100 parts of a dimethyl-polysiloxane having a viscosity of 1,000 cP represented by the following average formula:

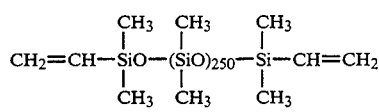

0.5 part of a methylhydrogensiloxane having the following formula:

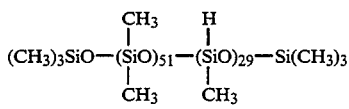

10 parts of a hydrogensiloxane having the following average formula:

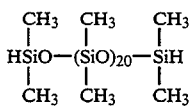

0.5 part of a silane compound as shown in Table 2, and 0.05 part of an organic aluminum compound as shown in Table 2 were compounded together (except that not any silane compound was compounded in Comparative Example 5, not any organic aluminum compound was added in Comparative Examples 6 to 10, and neither silane compound nor organic aluminum compound was used in Comparative Example 11), and compounded with 0.03 part of an isopropyl alcohol solution of chloroplatinic acid (elemental platinum content: 2 wt. %). In this manner, 12 kinds of curable compositions were prepared.

TABLE 2

| Example | Silane compound | Organic aluminum compound |
| --- | --- | --- |
| Example 5 | Si(MeO)$_4$ | Al(1) |
| Example 6 | MeSi(MeO)$_3$ | Al(1) |
| Example 7 | Me$_2$Si(MeO)$_2$ | Al(1) |
| Example 8 | (MeO)$_3$SiCH$_2$COOEt | Al(2) |
| Comp.Ex. 4 | SiMe$_4$ | Al(3) |
| Comp.Ex. 5 | — | Al(1) |
| Comp.Ex. 6 | Si(MeO)$_4$ | — |
| Comp.Ex. 7 | MeSi(MeO)$_3$ | — |
| Comp.Ex. 8 | Me$_2$Si(MeO)$_2$ | — |
| Comp.Ex. 9 | (MeO)$_3$SiCH$_2$COOEt | — |
| Comp.Ex. 10 | SiMe$_4$ | — |
| Comp.Ex. 11 | — | — |

The organic aluminum compounds Al(1) to Al(3) used were as follows:

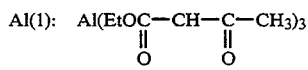

Cured products obtained respectively from the compositions prepared as above were tested for adhesion to glass and acrylic resin by 180° peel test. The peel test was carried out in the same manner as in Example 1 except that two sets of curing conditions, heating at 60° C. for 15 minutes and heating at 60° C. for 30 minutes, were used.

The results are given in Table 3.

Every one of the compositions was cured to a transparent gel, either colorless or faintly cloudy. Penetration values of the compositions are also given in Table 3.

TABLE 3

| Composition | Penetration | Peel strength of cured product (gf/cm) | | | |
| --- | --- | --- | --- | --- | --- |
| | | 60° C. × 15 min | | 60° C. × 30 min | |
| | | Glass | Acrylic resin | Glass | Acrylic resin |
| Example 5 | 23 | 220 | 230 | 230 | 230 |
| Example 6 | 24 | 200 | 220 | 210 | 230 |
| Example 7 | 22 | 170 | 150 | 190 | 180 |
| Example 8 | 25 | 220 | 230 | 230 | 240 |
| Comp.Ex. 4 | 21 | 31 | 23 | 35 | 30 |
| Comp.Ex. 5 | 24 | 20 | 34 | 39 | 35 |
| Comp.Ex. 6 | 23 | 64 | 35 | 120 | 120 |
| Comp.Ex. 7 | 23 | 70 | 37 | 100 | 92 |
| Comp.Ex. 8 | 23 | 67 | 22 | 95 | 44 |
| Comp.Ex. 9 | 25 | 110 | 100 | 200 | 190 |
| Comp.Ex. 10 | 22 | 37 | 33 | 54 | 46 |
| Comp.Ex. 11 | 25 | 37 | 47 | 53 | 38 |

We claim:

1. A gel-forming silicone composition comprising:
   (A) an organopolysiloxane containing an average of from 0.1 to 2 silicon-bonded alkenyl groups in its molecule and having a viscosity of from 50 to 100,000 cP at 25° C.;
   (B) an organohydrogenpolysiloxane containing an average of at least 2 silicon-bonded hydrogen atoms in its molecule, the amount of said silicon-bonded hydrogen atoms being in the range from 0.2 to 3.0 equivalents per equivalent of vinyl groups in said organopolysiloxane (A);
   (C) (C-1) a silane compound having the following general formula (1):

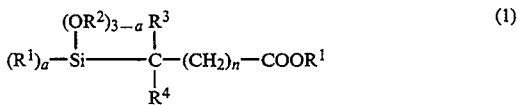

wherein $R^1$ is an alkyl or aryl group, $R^2$ is an alkyl group or an alkoxyalkyl group, $R^3$ and $R^4$ may be the same or different from each other and are each any one of a hydrogen atom, a methyl group or an ethyl group, a is an integer from 0 to 2, and n is an integer from 0 to 2, or
   (C-2) a silane compound having the following general formula (2):

wherein $R^2$ is the same as defined above, $R^5$ is at least one group selected from the group consisting of alkyl, aryl, halosubstituted alkyl, halosubstituted aryl groups, hydrogen atom, and groups represented by the following formula (2a):

wherein in the formulas (2a), R is an alkylene group, and $R^6$ is an alkyl group or an aryl group, and b is an integer from 0 to 2, or partial hydrolyzate thereof; and
   (D) a platinum group metal catalyst.

2. The composition of claim 1, wherein said silane compound of the component (C) is compounded in an amount of from 0.01 to 10 parts by weight per 100 parts by weight of said organopolysiloxane of the component (A).

3. The composition of claim 1, in which the component (C) comprises said silane compound or partial hydrolyzate thereof (C-2), and which further comprises an organic aluminum compound.

4. The composition of claim 3, wherein said organic aluminum compound comprises at least one compound selected from the group consisting of aluminum alcoholates, aluminum alkylacetoacetates, alkylacetoacetatoaluminum alcoholates and cyclic aluminum oxide alcoholares.

5. The composition of claim 3, wherein said organic aluminum compound is compounded in an amount of from 0.001 to 1 part by weight per 100 parts by weight of said organopolysiloxane of the component (A).

* * * * *